United States Patent
Ishii et al.

(10) Patent No.: US 9,587,297 B2
(45) Date of Patent: Mar. 7, 2017

(54) FERRITIC STAINLESS STEEL EXCELLENT IN CORROSION RESISTANCE AND CONDUCTIVITY AND METHOD FOR MANUFACTURING THE SAME, SEPARATOR OF PROTON-EXCHANGE MEMBRANE FUEL CELL AND PROTON-EXCHANGE MEMBRANE FUEL CELL

(75) Inventors: Tomohiro Ishii, Chiba (JP); Shin Ishikawa, Chiba (JP); Takumi Ujiro, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 508 days.

(21) Appl. No.: 13/876,234

(22) PCT Filed: Oct. 6, 2011

(86) PCT No.: PCT/JP2011/073596
§ 371 (c)(1),
(2), (4) Date: Jul. 12, 2013

(87) PCT Pub. No.: WO2012/046879
PCT Pub. Date: Apr. 12, 2012

(65) Prior Publication Data
US 2013/0316262 A1    Nov. 28, 2013

(30) Foreign Application Priority Data

Oct. 8, 2010  (JP) .................................. 2010-228344
Oct. 4, 2011  (JP) .................................. 2011-219755

(51) Int. Cl.
C23C 22/06    (2006.01)
C23C 22/48    (2006.01)
(Continued)

(52) U.S. Cl.
CPC ................ *C22C 38/22* (2013.01); *B21B 1/28* (2013.01); *C22C 38/001* (2013.01);
(Continued)

(58) Field of Classification Search
CPC ..... C23C 38/02; C23C 38/001; C23C 38/002; C23C 38/004; C23C 38/005; C23C 38/04;
(Continued)

(56) References Cited

U.S. PATENT DOCUMENTS

2006/0105218 A1    5/2006  Ishikawa et al.
2008/0233456 A1    9/2008  Ishikawa et al.
2011/0024002 A1    2/2011  Ishikawa et al.

FOREIGN PATENT DOCUMENTS

EP    2 667 439 A1    11/2013
EP    2 738 277 A1    6/2014
(Continued)

OTHER PUBLICATIONS

Dec. 27, 2011 International Search Report issued in International Application No. PCT/JP2011/073596 (with translation).
(Continued)

*Primary Examiner* — Lois Zheng
(74) *Attorney, Agent, or Firm* — Oliff PLC

(57) ABSTRACT

A ferritic stainless steel excellent in corrosion resistance and conductivity and a method for manufacturing the same, the stainless steel having a chemical composition containing, by mass %, C: 0.001% or more and 0.05% or less, Si: 0.001% or more and 0.5% or less, Mn: 0.001% or more and 1.0% or less, Al: 0.001% or more and 0.5% or less, N: 0.001% or more and 0.05% or less, Cr: 17% or more and 23% or less, Mo: 0.1% or less and the balance being Fe and inevitable impurities and a passivation film on the surface of the stainless steel which is obtained by immersing the stainless steel in a solution for an immersion treatment, said solution
(Continued)

mainly contains hydrofluoric acid or a liquid mixture of hydrofluoric acid and nitric acid.

16 Claims, 2 Drawing Sheets

(51) Int. Cl.
  C22C 38/22      (2006.01)
  C22C 38/00      (2006.01)
  C22C 38/02      (2006.01)
  C22C 38/04      (2006.01)
  C22C 38/06      (2006.01)
  C22C 38/18      (2006.01)
  H01M 8/02       (2016.01)
  C23G 1/08       (2006.01)
  B21B 1/28       (2006.01)
  C22C 38/20      (2006.01)
  C22C 38/24      (2006.01)
  C22C 38/26      (2006.01)
  C22C 38/28      (2006.01)
  C22C 38/32      (2006.01)
  C22C 38/44      (2006.01)
  C23C 22/50      (2006.01)
  H01M 8/10       (2016.01)

(52) U.S. Cl.
  CPC .......... *C22C 38/002* (2013.01); *C22C 38/004* (2013.01); *C22C 38/005* (2013.01); *C22C 38/02* (2013.01); *C22C 38/04* (2013.01); *C22C 38/06* (2013.01); *C22C 38/18* (2013.01); *C22C 38/20* (2013.01); *C22C 38/24* (2013.01); *C22C 38/26* (2013.01); *C22C 38/28* (2013.01); *C22C 38/32* (2013.01); *C22C 38/44* (2013.01); *C23G 1/086* (2013.01); *H01M 8/021* (2013.01); *H01M 2008/1095* (2013.01); *Y02E 60/50* (2013.01); *Y02P 70/56* (2015.11)

(58) Field of Classification Search
  CPC .......... C23C 38/06; C23C 38/20; C23C 38/22; C23C 38/24; C23C 38/26; C23C 38/28; C23C 38/32; C23C 38/44; H01M 8/21; B21B 1/28
  See application file for complete search history.

(56) References Cited

FOREIGN PATENT DOCUMENTS

| | | | |
|---|---|---|---|
| JP | A-6-49599 | 2/1994 | |
| JP | A-9-157797 | 6/1997 | |
| JP | A-2001-3143 | 1/2001 | |
| JP | A-2004-149920 | 5/2004 | |
| JP | A-2005-89800 | 4/2005 | |
| JP | A-2005-302713 | 10/2005 | |
| JP | A-2006-253107 | 9/2006 | |
| JP | A-2008-91225 | 4/2008 | |
| JP | A-2008-285693 | 11/2008 | |
| JP | 2008-303445 | * 12/2008 | ............. C22C 38/00 |
| WO | WO 2005/035816 A1 | 4/2005 | |

OTHER PUBLICATIONS

Jul. 5, 2016 Extended European Search Report issued in European Patent Application No. 11830806.3.

* cited by examiner

FERRITIC STAINLESS STEEL EXCELLENT IN CORROSION RESISTANCE AND CONDUCTIVITY AND METHOD FOR MANUFACTURING THE SAME, SEPARATOR OF PROTON-EXCHANGE MEMBRANE FUEL CELL AND PROTON-EXCHANGE MEMBRANE FUEL CELL

TECHNICAL FIELD

The present invention relates to ferritic stainless steel excellent in corrosion resistance and conductivity as it is, despite not having undergone a surface treatment such as plating and to a manufacturing method of the same. A separator of a proton-exchange fuel cell being manufactured by using the stainless steel, and a proton-exchange fuel cell being manufactured by using said separator.

BACKGROUND ART

Nowadays, fuel cells which are excellent in power generation efficiency and which do not emit $CO_2$ are being developed from the viewpoint of global environment conservation. Fuel cells are classified into types such as a phosphoric-acid fuel cell, a solid oxide fuel cell and a proton-exchange membrane fuel cell on the basis of kind of electrolyte which is used for the fuel cell. Among these fuel cells, proton-exchange membrane fuel cells are applied to stationary type electric generators for household use, onboard power supplies of fuel-cell electric vehicles and so forth, because proton-exchange membrane fuel cells can work at a low temperature of 100° C. or lower, can be started up in a short time and can be suitably reduced in size.

In the case of proton-exchange membrane fuel cells, desired power is obtained by connecting many cells, which consist of proton-exchange membranes being placed between separators, in series. Graphite has been used for separators up to now, because good conductivity and corrosion resistance under a condition of high potential are required for the separators. However, there is a problem in that graphite has a low impact resistance and graphite is not easy to manufacture flow channels of hydrogen and so forth. Therefore, the application of stainless steel, which has high impact resistance and workability, to the separators is being investigated.

However, it is difficult to use stainless steel as a separator as it is, because stainless steel has high contact resistance due to a passivation film which is formed on the surface of the stainless steel.

In order to solve the problem, focusing on a passivation film of stainless steel, methods for decreasing contact resistance by reforming the passivation film are being investigated (for example, patent documents 1 through 3).

Patent document 1 discloses stainless steel to be used for a separator of a proton-exchange membrane fuel cell having a chemical composition containing, by mass %, C≤0.03%, N≤0.03%, 20%≤Cr≤45% and 0.1%≤Mo≤5.0%, the atomic ratio of Cr to Fe Cr/Fe in a passivation film being 1 or more.

Patent document 2 discloses a separator for a proton-exchange membrane fuel cell, which is made of stainless steel, having a chemical composition containing, by mass %, 15%≤Cr≤40% and 1%≤Mo≤5%, and Mo/(Mo+Cr+Fe) in terms of atomic ratios comprising Mo, Cr and Fe in a passivation film being 0.3 or less and 1.5 times or more the value of Mo/(Mo+Cr+Fe) in a substrate.

Patent document 3 discloses a separator for a proton-exchange membrane fuel cell having a chemical composition containing, by mass %, 16%≤Cr≤40% and 1%≤Mo≤5%, micro pits whose diameters are 0.01 μm or more and 1 μm or less being formed in the entire region of the surface and the atomic ratio of Cr to Fe Cr/Fe in a passivation film being 4 or more.

CITATION LIST

Patent Document

[Patent document 1] Japanese Unexamined Patent Application Publication No. 2004-149920 (International Publication No. WO2005-035816A1)
[Patent document 2] Japanese Unexamined Patent Application Publication No. 2006-253107
[Patent document 3] Japanese Unexamined Patent Application Publication No. 2008-91225

SUMMARY OF INVENTION

Problems to be Solved by Invention

However, even by using these methods, there is a problem in that it is not always possible to ensure corrosion resistance in a possible potential range for a fuel cell to reach during power generation, in said potential range, Cr exhibits transpassive dissolution.

Specifically, in the case of a method according to patent document 1, there is a problem left in that ion solve out is significant in the range where Cr exhibits transpassive dissolution (for example, an environment in which pH value is 3 and a potential is 1.0 V (vs.SHE)) due to large contents of Cr and Mo and decrease in performance of an electrolyte membrane is caused in the case where a fuel cell reaches the potential range during power generation. Further, in the case of the method according to patent document 2, although contact resistance is kept at low level for a long time by keeping a condition in which a passivation film is thin by making the passivation film contain Mo. But in an environment of a fuel cell for automotive application or the like, where the fuel cell is started up and stopped frequently, there is a problem left in a thin passivation film cannot be kept because Mo in the passivation film dissolves in an oxidizing environment of high potential occurring at a time of starting up. Furthermore, in the case of the method according to patent document 3, in which contact area with a carbon paper is increased by creation of micro pits, there is a problem left in that ion solve out from a passivation film is significant in a potential range in which Cr exhibits transpassive dissolution. Because Cr is enriched in a passivation film and there is an increase in a surface area due to creation of micro pits.

The present invention has been completed in view of the situation described above. And an object of the present invention is to provide ferritic stainless steel excellent in corrosion resistance and conductivity that can be ideally used for a separator of a proton-exchange membrane fuel cell. Said proton-exchange membrane fuel cell has low contact resistance and makes it possible to achieve corrosion resistance in a potential range in which Cr exhibits transpassive dissolution. A separator of a proton-exchange membrane fuel cell which is made of the ferritic stainless steel and a proton-exchange membrane fuel cell which consists of such a separator.

Solution to Problem

In order to solve the problems described above, the present inventors conducted investigations on the influences of a chemical composition of a ferritic stainless steel, and immersing the ferritic stainless steel into acid, on a contact resistance and on a transpassive dissolution. As a result, by specifying the chemical composition and by reforming a passivation film by using an immersion treatment in a solution mainly containing a specified acid, it is possible to achieve not only low contact resistance but also corrosion resistance in a potential range in which Cr exhibits the transpassive dissolution.

The present invention has been completed on the basis of the knowledge described above and provides the following items (1) through (13).

(1) A ferritic stainless steel excellent in corrosion resistance and conductivity, the stainless steel having a chemical composition containing, by mass %, C: 0.001% or more and 0.05% or less, Si: 0.001% or more and 0.5% or less, Mn: 0.001% or more and 1.0% or less, Al: 0.001% or more and 0.5% or less, N: 0.001% or more and 0.05% or less, Cr; 17% or and 23% or less, Mo: 0.1% or less and the balance being Fe and inevitable impurities, and the stainless steel having a passivation film on the surface of the stainless steel, said film is obtained by immersing the stainless steel in a solution for an immersion treatment, said solution mainly contains hydrofluoric acid or a liquid mixture of hydrofluoric acid and nitric acid, and in said solution the relationship represented by the following expression (1) is satisfied, where [HF] denotes the concentration of hydrofluoric acid (mass %) and [$HNO_3$] denotes the concentration of nitric acid (mass %).

$$[HF] \geq [HNO_3] \quad (1)$$

([$HNO_3$] includes zero)

(2) The ferritic stainless steel excellent in corrosion resistance and conductivity according to item (1), the concentration of hydrofluoric acid (mass %) [HF] and the concentration of nitric acid (mass %) [$HNO_3$] in the solution for an immersion treatment satisfying the relationship represented by the following expression (2).

$$[HF] \geq 2.5[HNO_3] \quad (2)$$

([$HNO_3$] includes zero)

(3) The ferritic stainless steel excellent in corrosion resistance and conductivity according to item (1) or (2), the atomic ratio of Mn to Fe Mn/Fe in the film being 0.01 or less.

(4) The ferritic stainless steel excellent in corrosion resistance and conductivity according to any one of items (1) to (3), the stainless steel having a chemical composition further containing, by mass %, one, two or more of Ti: 0.6% or less, Nb: 0.6% or less, Zr: 0.6% or less, Cu: 1.00% or less and Ni: 1.00% or less.

(5) The ferritic stainless steel excellent in corrosion resistance and conductivity according to any one of items (1) to (4), the stainless steel having a chemical composition further containing, by mass %, one, or two or more of V: 1.0% or less, W: 1.0% or less, Ca: 0.1% or less, Mg: 0.1% or less, REM (Rare Earth Metals): 0.1% or less and B: 0.1% or less.

(6) A separator of a proton-exchange membrane fuel cell consisting of the ferritic stainless steel according to any one of items (1) to (5).

(7) A proton-exchange membrane fuel cell utilizing the ferritic stainless steel according to any one of items (1) to (5) for a separator.

(8) A method for manufacturing ferritic stainless steel, the method including subjecting a cold-rolled stainless steel sheet or an annealed cold-rolled stainless steel sheet having the chemical composition according to any one of items (1), (4) or (5) to an immersion treatment in a solution for the immersion treatment, said solution mainly contains hydrofluoric acid or a liquid mixture of hydrofluoric acid and nitric acid and said solution is adjusted so that the relationship between the concentration of hydrofluoric acid (mass %) [HF] and the concentration of nitric acid (mass %) [$HNO_3$] becomes [HF]$\geq$[$HNO_3$] ([$HNO3$] includes zero).

(9) A method for manufacturing ferritic stainless steel, the concentration of hydrofluoric acid (mass %) [HF] and the concentration of nitric acid (mass %) [$HNO_3$] in the solution for the immersion treatment according to item (8) satisfying the relationship represented by the following expression (2).

$$[HF] \geq 2.5[HNO_3] \quad (2)$$

([$HNO3$] includes zero)

(10) A ferritic stainless steel having a chemical composition containing, by mass %, C: 0.001% or more and 0.05% or less, Si: 0.001% or more and 0.5% or less, Mn: 0.001% or more and 1.0% or less, Al: 0.001% or more and 0.5% or less, N: 0.001% or more and 0.05% or less, Cr; 17% or more and 23% or less, Mo: 0.1% or less and the balance being Fe and inevitable impurities, the stainless steel being to be immersed in a solution for an immersion treatment, said solution mainly contains hydrofluoric acid or a liquid mixture of hydrofluoric acid and nitric acid, and said solution is adjusted so that the relationship between the concentration of hydrofluoric acid (mass %) [HF] and the concentration of nitric acid (mass %) [$HNO_3$] becomes [HF]$\geq$[$HNO_3$] ([$HNO3$] includes zero).

(11) A ferritic stainless steel, the concentration of hydrofluoric acid (mass %) [HF] and the concentration of nitric acid (mass %) [$HNO_3$] in the solution for an immersion treatment according to item (10) satisfying the relationship represented by the following expression (2).

$$[HF] \geq 2.5[HNO_3] \quad (2)$$

([$HNO3$] includes zero)

(12) The ferritic stainless steel according to item (10) or (11), the stainless steel having a chemical composition further containing, by mass %, one, or two or more of Ti: 0.6% or less, Nb: 0.6% or less, Zr: 0.6% or less, Cu: 1.00% or less and Ni: 1.00% or less.

(13) The ferritic stainless steel according to any one of items (10) to (12), the stainless steel having a chemical composition further containing, by mass %, one, or two or more of V: 1.0% or less, W: 1.0% or less, Ca: 0.1% or less, Mg: 0.1% or less, REM (Rare Earth Metals): 0.1% or less and B: 0.1% or less.

Advantageous Effects of Invention

According to the present invention, it is possible to obtain ferritic stainless steel that can be ideally used for a separator of a proton-exchange membrane fuel cell suppressing an increase in contact resistance for a long time of power generation, ensuring corrosion resistance in a potential range in which Cr exhibits transpassive dissolution despite not having undergone a surface treatment such as plating. According to the present invention, it is possible to obtain a method for manufacturing the stainless steel, a separator of a proton-exchange membrane fuel cell which is made of the stainless steel and a proton-exchange membrane fuel cell which consists of such a separator.

DESCRIPTION OF EMBODIMENTS

Figure 1:
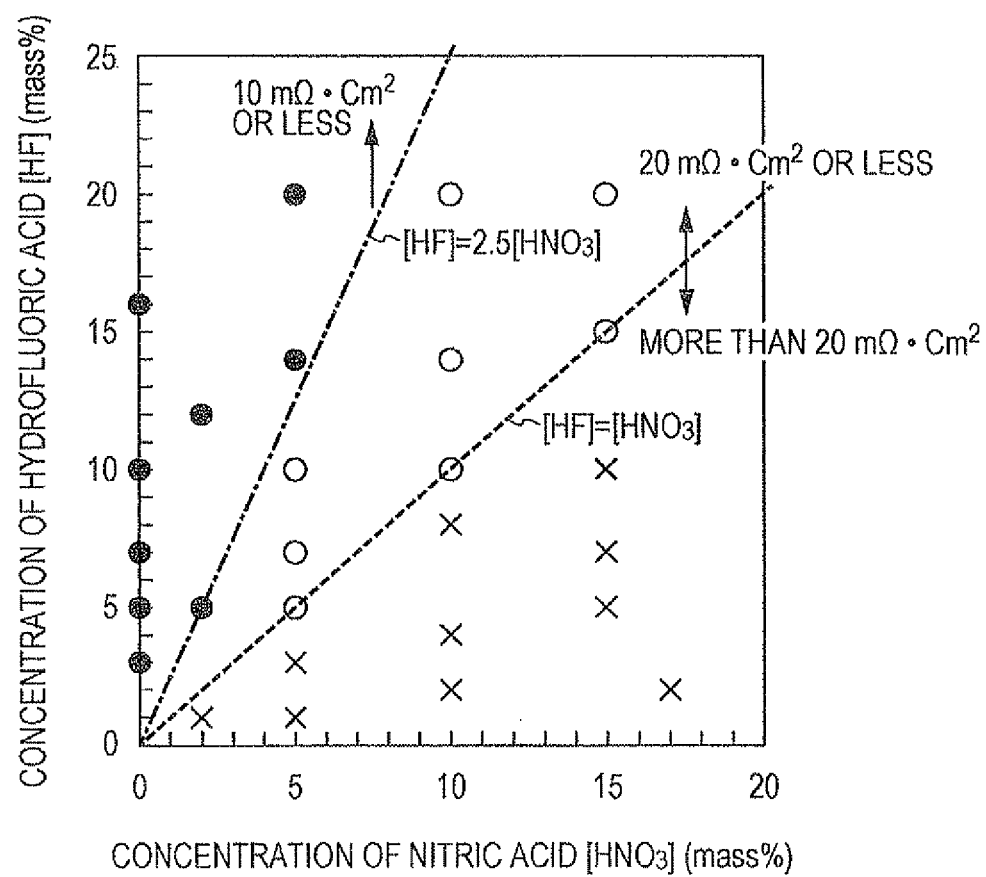
FIG. 1 is a graph illustrating an influence of the concentration of hydrofluoric acid and the concentration of nitric acid on contact resistance after immersion in a liquid mixture of hydrofluoric acid and nitric acid has been performed.

The present invention will be described in detail hereafter.

The ferritic stainless steel according to the present invention has a specified chemical composition and a passivation film on the surface of the stainless steel, said film is obtained by immersing the stainless steel in a solution for an immersion treatment, said solution mainly contains hydrofluoric acid or a liquid mixture of hydrofluoric acid and nitric acid and in said solution the relationship represented by the following expression (1) is satisfied, where [HF] denotes the concentration of hydrofluoric acid and [HNO$_3$] denotes the concentration of nitric acid.

[HF]≥[HNO$_3$]  (1)

Moreover it is more preferable that the following expression (2) be satisfied.

[HF]≥2.5[HNO$_3$]  (2)

In addition, the concentration of hydrofluoric acid [HF] and the concentration of nitric acid [HNO$_3$] in the present invention are given in units of mass %.

The present inventors conducted various investigations on a contact resistance by immersing ferritic stainless steel having various chemical compositions in various kinds of acid such as hydrochloric acid, sulfuric acid and a liquid mixture of hydrofluoric acid and nitric acid, and, as a result, found that a film, which is obtained by reforming a passivation film by immersing ferritic stainless steel having a specific chemical composition in a solution for an immersion treatment, in said solution the relationship [HF]≥[HNO$_3$] is satisfied as described above, reduces contact resistance down to a value which is ideal for a separator of a proton-exchange membrane fuel cell.

The knowledge described above was derived from Example 1 which will be described below. That is to say, in reference to FIG. 1 in which Example 1 is summarized, the following results were derived:

1) Contact resistance becomes less than an aimed value of 20 mΩ·cm$^2$ by immersing ferritic stainless steel in a solution for an immersion treatment, in said solution the concentration of hydrofluoric acid [HF] and the concentration of nitric acid [HNO$_3$] satisfy the relationship represented by the expression (1) described above, that is, [HF]≥[HNO$_3$].

2) Moreover, contact resistance is further decreased down to the value of less than 10 mΩ·cm$^2$ by immersing ferritic stainless steel in a solution for an immersion treatment in which the relationship represented by the expression (2) described above, that is, [HF]≥2.5[HNO$_3$] is satisfied.

On the basis of these results, according to the present invention, an essential requirement for ensuring contact resistance of ferritic stainless steel which can be used as a separator of a proton-exchange membrane fuel cell is that the ferritic stainless steel have a passivation film which is formed by immersing the ferritic stainless steel in a solution for an immersion treatment in which the expression (1) described above is satisfied, and a preferable requirement is that the ferritic stainless steel have a passivation film which is formed by immersing the ferritic stainless steel in a solution for an immersion treatment, in said solution the expression (2) described above is satisfied.

In addition, the meaning of "a solution for an immersion treatment mainly contains hydrofluoric acid or a liquid mixture of hydrofluoric acid and nitric acid" is that hydrochloric acid, sulfuric acid, organic acid, an accelerator, an inhibitor and so forth may be contained in the solution for an immersion treatment in addition to hydrofluoric acid and nitric acid. In the case where these are contained, it is preferable that the contents of hydrochloric acid, sulfuric acid and organic acid be 20 mass % or less each and 50 mass % or less in total. In the case of an accelerator and an inhibitor are added, it is preferable that their contents be 3.0 volume % or less each.

The chemical composition of stainless steel for a separator of a proton-exchange membrane fuel cell according to the present invention will be described hereafter. The stainless steel according to the present invention is ferritic stainless steel having a chemical composition containing the chemical components in the ranges as described below, respectively. Here, concerning a chemical component, "%" shall denote "mass %", unless otherwise noted.

Cr: 17% or More and 23% or Less

Cr is an important element which determines the corrosion resistance of stainless steel, and, in the case where a potential is in a range of a passive state, the higher the Cr content, the better the corrosion resistance. A practical service environment of a separator of a fuel cell is usually in a passive state, where high corrosion resistance is required. In the case where a Cr content is less than 17%, sufficient corrosion resistance cannot be ensured and there is an increase in contact resistance due to a power generation for a long time. On the other hand, the present inventors conducted a constant potential test in a transpassive state (for example, in an environment of being in a sulfuric acid solution having a pH value of 3 and at an applied potential of 1.0 V (vs.SHE)) and estimated contact resistance after the constant potential test had been performed, and, as a result, the tendency that transpassive dissolution was accelerated along with an increase in a Cr content in steel was confirmed. That is to say, in the case where a potential is increased up to a transpassive state, Cr dissolves as hexavalent ions, and thus, transpassive dissolution is accelerated along with an increase in a Cr content. Acceleration of transpassive dissolution fosters growth of a passivation film or formation of a corrosion product, which results in an increase in contact resistance. In addition, dissolution of a Cr ion results in a decrease in the performance of an electrolyte membrane of a fuel cell. Acceleration of transpassive dissolution described above is significant in the case where the Cr content is more than 23%. Therefore, the Cr content in steel is set to be 17% or more and 23% or less, preferably 20% or more and 22% or less.

Mo: 0.1% or Less

Figure 2:
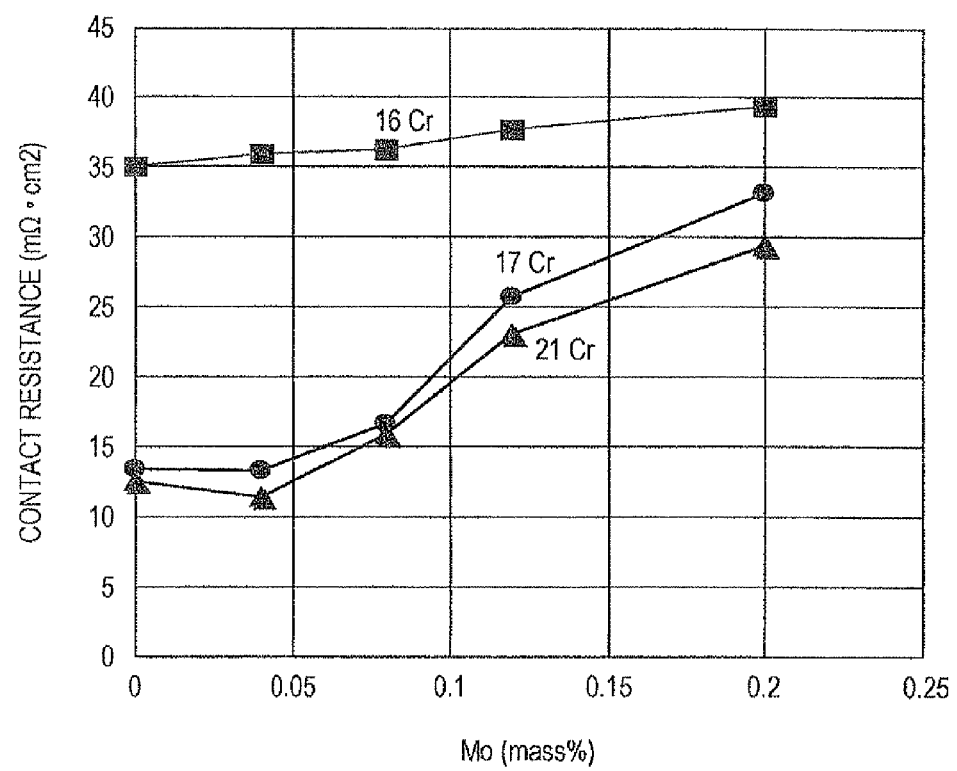
FIG. 2 is a graph illustrating an influence of Cr content and Mo content in steel on contact resistance after a endurance test has been performed in a potential range in which Cr exhibits transpassive dissolution.

Mo is generally a chemical element which increases corrosion resistance of stainless steel. It is preferable that Mo content be 0.005% or more in order to realize this effect. However, comparing in constant Cr content, it has been found that an increase in contact resistance after a constant potential test has been performed is more significant in the case of stainless steel having a Mo content of more than 0.1%, in comparison to the case of stainless steel having no Mo content. The contact resistance of stainless steel having a Cr content of 16% or more and 21% or less which was immersed in a solution of 12% HF+4% HN$_3$ at a temperature of 60° C. for a duration of 60 seconds was observed after a constant potential test had been conducted in a sulfuric acid solution of pH 3 and at an applied potential of 1.0 V (vs.SHE) for a duration of 1 hour as a endurance test. The results of the test are illustrated in FIG. 2. It was found that, in the case of stainless steel having a Cr content of 17% or more, the contact resistance was equal to the target value of 20 mΩ·cm$^2$ or less in the case where Mo content was 0.1% or less. And an increase in contact resistance was significant in the case where the Mo content was more than 0.1%. It is thought that the increase in contact resistance was significant, because transpassive dissolution was accelerated due to there being a Mo content of more than 0.1%. Therefore, it is desirable that the Mo content be as small as possible, and the Mo content is set to be 0.1% or less, preferably 0.08% or less, and more preferably 0.02% or less.

C: 0.001% or More and 0.05% or Less

C is a chemical element which is inevitably contained in stainless steel and effectively increases the strength of steel by solute strengthening. This effect cannot be realized with a C content of less than 0.001%. On the other hand, an increase in the C content accelerates precipitation of Cr carbide and locally decreases the Cr content of a matrix metal surrounding the Cr carbide, which results in a decrease in the corrosion resistance of stainless steel. This tendency is significant in the case where C content is more than 0.05%. Therefore, C content is set to be 0.001% or more and 0.05% or less, preferably 0.002% or more and 0.04% or less.

Si: 0.001% or More and 0.5% or Less

Si is a chemical element which is effective for deoxidation, and this effect is realized with a Si content of 0.001% or more. However, an excessive Si content makes fabrication of a separator difficult due to a decrease in workability. This tendency is significant in the case where the Si content is more than 0.5%. Therefore, the Si content is set to be 0.001% or more and 0.5% or less, preferably 0.002% or more and 0.4% or less.

Mn: 0.001% or More and 1.0% or Less

Mn is a chemical element which is inevitably contained in steel and effective for strengthening steel. This effect cannot be realized with a Mn content of less than 0.001%. However, since Mn causes precipitation of MnS which becomes a source of corrosion, an excessive Mn content causes a decrease in corrosion resistance. In addition, it was confirmed that there is a tendency of an increase in contact resistance due to the existence of Mn in a passivation film. These kinds of negative influences are significant in the case where the Mn content is more than 1.0%. Therefore, the Mn content is set to be 0.001% or more and 1.0% or less, preferably 0.002% or more and 0.8% or less.

Al: 0.001% or More and 0.5% or Less

Al is a chemical element which is effective for deoxidation, and this effect is realized with an Al content of 0.001% or more. However, the excessive Al content of more than 0.5% causes problems not only in fabrication of a separator due to a decrease in workability but also in descaling by pickling in the case where an oxidized film is formed, which results in a decrease in manufacturability. Therefore, the Al content is set to be 0.001% or more and 0.5% or less, preferably 0.002% or more and 0.4% or less.

N: 0.001% or More and 0.05% or Less

N is, as well as C, a chemical element which is inevitably contained in steel and effective for increasing the strength of steel by solute strengthening. Moreover, N is also effective for increasing corrosion resistance by forming a solid solution in steel. These effects cannot be realized with a N content of less than 0.001%. On the other hand, excessive N content of more than 0.05% cause a decrease in corrosion resistance of stainless steel by precipitating Cr nitride. Therefore, N content is set to be 0.001% or more and 0.05% or less, preferably 0.002% or 0.04%.

In addition to the essential chemical elements described above, the following chemical elements may be contained as needed.

Ti: 0.6% or Less

Ti is a chemical element suppresses a decrease in corrosion resistance by preventing a precipitation of Cr carbonitride, since Ti combines preferentially with C and N. However, an excessive Ti content of more than 0.6% causes not only a decrease in workability but also an increase in the particle size of Ti carbonitride, which results in the formation of surface defects. Therefore, in the case where Ti is contained, the Ti content is set to be 0.6% or less. It is preferable that the Ti content be 0.01% or more and 0.6% or less, because the effect described above is realized more effectively with a Ti content of 0.01% or more. The Ti content is more preferably 0.05% or more and 0.4% or less.

Nb: 0.6% or less

Nb is a chemical element which suppresses a decrease in corrosion resistance by preventing a precipitation of Cr carbonitride, since Nb combines preferentially with C and N. However, an excessive Nb content of more than 0.6% causes an increase in warm strength and hot rolling load, which results in difficulty in manufacturing. Therefore, in the case where Nb is contained, the Nb content is set to be 0.6% or less. It is preferable that the Nb content be 0.01% or more and 0.6% or less, because the effect described above is realized more effectively with a Nb content of 0.01% or more. The Nb content is more preferably 0.05% or more and 0.4% or less.

Zr: 0.6% or Less

Zr is a chemical element which suppresses a decrease in corrosion resistance by preventing a precipitation of Cr carbonitride, since Zr combines preferentially with C and N. However, an excessive Zr content of more than 0.6% causes a decrease in workability. Therefore, in the case where Zr is contained, the Zr content is set to be 0.6% or less. It is preferable that the Zr content be 0.01% or more and 0.6% or less, because the effect described above is realized more effectively with a Zr content of 0.01% or more. The Zr content is more preferably 0.05% or more and 0.4% or less.

Cu: 1.00% or Less

Cu is a chemical element which is effective for increasing the corrosion resistance of stainless steel. However, excessive Cu content is not desirable, because it causes a decrease in the performance of an electrolyte membrane of a fuel cell due to increased dissolution of metal ions, and this tendency is significant with a Cu content of more than 1.00%. Therefore, in the case where Cu is contained, the Cu content is set to be 1.00% or less. It is preferable that the Cu content be 0.05% or more and 1.00% or less, because the effect described above is realized more effectively with a Cu content of 0.05% or more. The Cu content is more preferably 0.2% or more and 0.8% or less.

Ni: 1.00% or Less

Ni is a chemical element which is effective for increasing corrosion resistance of stainless steel. However, an excessive Ni content of more than 1.00% causes a decrease in corrosion resistance in a transpassive state due to acceleration of transpassive dissolution. Therefore, in the case where Ni is contained, the Ni content is set to be 1.00% or less. It is preferable that the Ni content be 0.05% or more and 1.00% or less, because the effect described above is realized more effectively with a Ni content of 0.05% or more. The Ni content is more preferably 0.2% or more and 0.8% or less.

In addition, other than the chemical elements described above, in order to increase corrosion resistance, 1.0% or less each of V and W may be contained. In order to realize these effects, it is preferable that the contents of V and W be respectively 0.01% or more and 0.01% or more.

Moreover, in order to increase hot workability, 0.1% or less each of Ca, Mg, REM (Rare Earth Metals) and B may be contained. In order to realize these effects, it is preferable that the contents of Ca, Mg, REM and B be respectively 0.0005% or more, 0.0005% or more, 0.0005% or more and 0.0001% or more.

The balance of the chemical composition is Fe and inevitable impurities. Among the inevitable impurities, it is preferable that an O content be 0.02% or less, a P content be 0.05% or less, a S content be 0.01% or less and a Sn content be 0.5% or less. It is more preferable that the O content be 0.01% or less, the P content be 0.03% or less, the S content be 0.008% or less and the Sn content be 0.3% or less.

A chemical composition of a passivation film which is obtained by immersing ferritic stainless steel in the solution for an immersion treatment described above will be described hereafter.

In many cases where immersion in acid is not performed after a bright annealing treatment in a final annealing process, Mn is detected in a passivation film of ferritic stainless steel. From the result of investigations on the correlation between existence of Mn in a passivation film and contact resistance, it was confirmed that there is a tendency that the contact resistance is high in the case where Mn is observed in the passivation film. Therefore, the amount of Mn becomes small in a film which is obtained by reforming the passivation film by immersing ferritic stainless steel in the solution for the immersion treatment described above. Therefore, it is preferable that preferable range of an atomic ratio Mn/Fe in a passivation film be 0.01 or less.

An ideal method for manufacturing the ferritic stainless steel according to the present invention will be described hereafter.

Although, according to the present invention, there are no particular limitations on a manufacturing method for ferritic stainless steel as a substrate and well-known methods may be applied, ideal manufacturing conditions will be described hereafter.

After stainless steel having a chemical composition described above is produced by melting and casting, the the stainless steel is heated up to a temperature of 1100° C. or higher and 1300° C. or lower, then the steel is hot-rolled with a finishing temperature of 700° C. or higher and 1000° C. or lower and a coiling temperature of 400° C. or higher and 700° C. or lower into a hot-rolled steel strip having a thickness of 2.0 mm or more and 5.0 mm or less. The hot-rolled steel strip obtained as described above is annealed at a temperature of 800° C. or higher and 1200° C. or lower, then the steel strip is pickled, then the steel strip is cold-rolled, then the cold-rolled steel strip is annealed, then, optionally, cold-rolling and annealing are performed repeatedly, and then a cold-rolled strip having a specified thickness is obtained. Pickling may be performed after annealing the cold-rolled steel strip. Thereafter, as a final annealing, bright annealing is performed at a temperature of 700° C. or higher and 1000° C. or lower in an atmosphere containing hydrogen, and then pickling is performed.

Pickling after a final annealing is performed in a pickling bath using the solution for an immersion treatment described above, said solution mainly contains hydrofluoric acid or a liquid mixture of hydrofluoric acid and nitric acid, and in said solution the concentration of hydrofluoric acid [HF] and the concentration of nitric acid [$HNO_3$] are adjusted so as to satisfy the relationship [HF]≥[$HNO_3$], preferably [HF]≥2.5 [$HNO_3$], at a temperature of 50° C. or higher and 70° C. or lower and for a duration of 10 seconds or more and 300 seconds or less. In this case, it is preferable that the concentration of hydrofluoric acid [HF] be 3.0% or more. An electrolytic treatment may be performed in addition to the immersion treatment. The stainless steel according to the present invention is obtained by the method described above.

In order to use the stainless steel according to the present invention as a separator of a proton-exchange membrane fuel cell, after obtaining a cold-rolled steel strip of foil type having a thickness of 0.003 mm or more and 0.3 mm or less by repeating cold rolling and annealing of a cold-rolled steel strip as described above, bright annealing as described above is performed as final annealing, then stainless steel to be used for a separator of a proton-exchange membrane fuel cell is obtained by further performing pickling in a solution for an immersion treatment as described above, and then a separator of a proton-exchange membrane fuel cell is obtained by putting the stainless steel into a specified final shape.

A cell consists of the separators obtained as described above and a solid polymer electrolyte membrane which is placed between the separators, and a proton-exchange fuel cell is obtained by piling many of the obtained cells in series.

EXAMPLES

Examples of the present invention will be described hereafter.

Example 1

Stainless steel indicated by No. 3 in Table 1 described below was produced by vacuum melting and casting, and then heated up to a temperature of 1250° C. Subsequently, hot rolling, annealing of the hot-rolled steel strip (850° C. or higher and 1050° C. or lower) and pickling were performed. Then, stainless steel foil having a thickness of 0.3 mm was obtained by further performing cold rolling, annealing of the cold-rolled steel strip (800° C. or higher and 900° C. or lower), pickling and bright annealing.

Firstly, contact resistance between a carbon paper and stainless steel of No. 3 as bright annealed was observed with a pushing pressure of 1 MPa. As a result, contact resistance was 289 m$\Omega$·$cm^2$, which was much larger than the target value of 20 m$\Omega$·$cm^2$. Secondly, contact resistance was observed after stainless steel of No. 3 was immersed in a liquid mixture of hydrofluoric acid and nitric acid in which the concentrations of hydrofluoric acid and nitric acid were adjusted to various values. As for immersion conditions, a liquid temperature was 60° C. and an immersion time was 60 seconds. The observation results of contact resistance after immersion had been performed are illustrated in FIG. 1. FIG. 1 illustrates the relationship between the composition of the liquid and contact resistance with the concentration of nitric acid in a liquid mixture of hydrofluoric acid and nitric acid on the horizontal axis and the concentration of hydrofluoric acid in a liquid mixture of hydrofluoric acid and nitric acid on the vertical axis, indicating the liquid which caused contact resistance 10 m$\Omega$·$cm^2$ or less by ●, the liquid which caused contact resistance 20 m$\Omega$·$cm^2$ or less by ○ and the liquid which caused contact resistance more than 20 m$\Omega$·$cm^2$ by ×.

In reference to FIG. 1, it is understood that contact resistance becomes the target value 20 m$\Omega$·$cm^2$ or less by immersing the stainless steel in a solution for an immersion treatment in which the relationship the concentration of hydrofluoric acid [HF]≥the concentration of nitric acid [HNO$_3$] is satisfied (corresponding to the range above the dotted line in FIG. 1). Moreover, it is understood that contact resistance becomes 10 mΩ·cm$^2$ or less, which means there is a further decrease in contact resistance, by immersing the stainless steel in a liquid mixture in which the relationship [HF]≥2.5[HNO$_3$] is satisfied (corresponding to the range above the dashed line in FIG. 1).

Example 2

Steel grades No. 1 through 15 in Table 1 were produced by vacuum melting and casting, and then heated up to a temperature of 1250° C. Subsequently, hot rolling, annealing of the hot-rolled steel strip (850° C. or higher and 1050° C. or lower) and pickling were performed. Then, stainless steel foil having a thickness of 0.3 mm was obtained by further performing cold rolling, annealing of the cold-rolled steel strip (800° C. or higher and 900° C. or lower), pickling and bright annealing. Thereafter, samples were prepared by immersing the obtained foil in a solution of 7 mass % HF+5 mass % HNO$_3$ (solution A, [HF]=1.4×[HNO$_3$]) or a solution of 12 mass % HF+4 mass % HNO$_3$ (solution B, [HF]=3×[HNO$_3$]), then contact resistance was observed. As for immersion conditions, a liquid temperature was 60° C. and an immersion time was 60 seconds. The observation results for solution A are given in Table 2, and for solution B in Table 3. Here, among steel grades No. 1 through 15, steel grades No. 2 through 4, 6 through 8 and 11 through 13 have chemical compositions within the range according to the present invention, and steel grades No. 1, 5, 9, 10, 14 and 15 have chemical compositions out of the range according to the present invention. In the cases of chemical compositions of No. 1 through 14, contact resistance was the target value 20 mΩ·cm$^2$ or less after immersion in any of solutions A and B had been performed, but, in the case of a chemical composition of No. 15, contact resistance was more than the target value 20 mΩ·cm$^2$ after immersion in any of solutions A and B had been performed.

Thereafter, as an endurance test, a constant potential test was conducted on the prepared samples, for a duration of 1 hour, simulating an environment of a fuel cell, in a sulfuric acid solution of pH 3 with a potential of 1.0 V (vs.SHE) at which Cr exhibits transpassive dissolution, and then contact resistance was observed. Pushing pressure was 1 MPa. The cases where contact resistance after the endurance test was 20 mΩ·cm$^2$ or less were estimated satisfactory similarly as before the endurance test. After immersion in solution A or B had been performed, the chemical composition of the passivation film was analyzed by using X-ray photoelectron spectroscopy. In particular, an atomic ratio Mn/Fe was calculated on the basis of the values obtained by dividing peak areas of Fe and Mn by the respective relative sensitivity factors, where the peak areas were determined by subtracting peaks of metallic state from the peak of electron orbit 2p3/2 of Mn corresponding to a binding energy of from 638 eV to 645 eV and the peak of electron orbit 2p3/2 of Fe corresponding to a binding energy of from 709 eV to 713 eV, respectively. These results are also given in Tables 2 and 3. Here, in Tables 2 and 3, the cases where Mn was not detected are indicated by the value of 0.000 for Mn/Fe.

In the case of the examples of the present invention where the samples having chemical compositions of No. 2 through 4, 6 through 8 and 11 through 13 were immersed in solution A or solution B, contact resistance remained 20 mΩ·cm$^2$ or less even after a endurance test had been performed. Moreover, among these samples, the contact resistance of the samples immersed in solution B was smaller than that of the samples immersed in solution A, and the increasing amount of the contact resistance by the endurance test of the former samples are smaller than that of the latter samples. Therefore, it is thought that the smaller the contact resistance before the endurance test is, the smaller the increasing amount of the contact resistance by the endurance test is. The contact resistance of any of the examples of the present invention immersed in solution B was 10 mΩ·cm$^2$ Or less before the endurance test. Therefore, it was confirmed that the value of contact resistance before the endurance test becomes more preferable by immersion in solution B in consideration of an increase in contact resistance by the endurance test.

The surfaces of the samples having high contact resistance were yellowish when they were observed after the endurance test. It is thought that a passivation film grew or corrosion products were formed by keeping the samples under the condition of high potential.

Moreover, in the case of the samples in which an atomic ratio Mn/Fe of a passivation film after immersion in solution A or solution B was 0.01 or more, an increase in contact resistance after the endurance test was significant. Although the mechanism of change in contact resistance by immersion in a liquid mixture of hydrofluoric acid and nitric acid and by a endurance test has not been made sufficiently clear, it is thought that growth of a film and formation of corrosion products become easy due to a decrease in protective performance of a film in the case where the amount of Mn in the film is large enough to make an atomic ratio Mn/Fe 0.01 or more, which may have some influence on an increase in contact resistance.

INDUSTRIAL APPLICABILITY

The ferritic stainless steel according to the present invention can be ideally used for a separator of a proton-exchange fuel cell, because the stainless steel suppresses an increase in contact resistance for a long time of power generation despite not having undergone a surface treatment such as plating and is possible to ensure corrosion resistance in a potential range in which Cr exhibits transpassive dissolution. In addition, the stainless steel according to the present invention can be used widely not only for a separator of a proton-exchange fuel cell but also for stainless steel electric parts having conductivity.

TABLE 1

| Steel Grade No. | Chemical Composition (mass %) | | | | | | | | | | |
|---|---|---|---|---|---|---|---|---|---|---|---|
| | C | Si | Mn | Al | N | Cr | Mo | Ti | Nb | Zr | Cu | Ni |
| 1 | 0.003 | 0.22 | 0.14 | 0.020 | 0.005 | 15.2 | — | — | 0.25 | — | — | — |
| 2 | 0.003 | 0.24 | 0.14 | 0.019 | 0.005 | 17.6 | — | — | 0.25 | — | — | — |
| 3 | 0.003 | 0.24 | 0.14 | 0.019 | 0.004 | 19.9 | — | — | 0.26 | — | — | — |

TABLE 1-continued

| Steel Grade No. | Chemical Composition (mass %) | | | | | | | | | | | |
|---|---|---|---|---|---|---|---|---|---|---|---|---|
| | C | Si | Mn | Al | N | Cr | Mo | Ti | Nb | Zr | Cu | Ni |
| 4 | 0.003 | 0.23 | 0.15 | 0.020 | 0.004 | 21.8 | — | — | 0.25 | — | — | — |
| 5 | 0.003 | 0.24 | 0.15 | 0.020 | 0.004 | <u>24.1</u> | — | — | 0.25 | — | — | — |
| 6 | 0.009 | 0.09 | 0.10 | 0.042 | 0.011 | 20.6 | 0.02 | 0.31 | — | — | — | 0.28 |
| 7 | 0.008 | 0.10 | 0.11 | 0.042 | 0.011 | 20.8 | 0.05 | 0.31 | — | — | — | 0.27 |
| 8 | 0.008 | 0.10 | 0.11 | 0.041 | 0.012 | 20.8 | 0.08 | 0.31 | — | — | — | 0.27 |
| 9 | 0.007 | 0.10 | 0.10 | 0.042 | 0.011 | 20.8 | <u>0.14</u> | 0.32 | — | — | — | 0.28 |
| 10 | 0.008 | 0.11 | 0.12 | 0.042 | 0.011 | 20.6 | <u>1.01</u> | 0.32 | — | — | — | 0.27 |
| 11 | 0.009 | 0.09 | 0.10 | 0.042 | 0.010 | 20.8 | — | 0.26 | — | — | 0.39 | 0.28 |
| 12 | 0.010 | 0.25 | 0.26 | 0.101 | 0.014 | 22.5 | — | — | 0.31 | — | 0.44 | 0.32 |
| 13 | 0.004 | 0.11 | 0.15 | 0.038 | 0.008 | 18.4 | 0.03 | — | — | 0.18 | — | 0.19 |
| 14 | 0.008 | 0.26 | 0.18 | 0.080 | 0.011 | 21.6 | <u>1.02</u> | — | 0.29 | — | — | 0.20 |
| 15 | 0.002 | 0.19 | 0.22 | 0.013 | 0.005 | <u>30.1</u> | <u>1.99</u> | — | 0.19 | — | — | — |

Under Lined values are out of the range according to the present invention.

TABLE 2

Result of Immersion in Solution A

| Test No. | Steel Grade No. | Contact Resistance (mΩ · cm²) | | Atomic Ratio of Mn to Fe Mn/Fe in Film | Note |
|---|---|---|---|---|---|
| | | Before Endurance test | After Endurance test with 1.0 V | | |
| A1 | 1 | 12.5 | <u>50.1</u> | 0.015 | Comparative Example |
| A2 | 2 | 11.4 | 19.2 | 0.006 | Example of invention |
| A3 | 3 | 10.2 | 18.4 | 0.000 | Example of invention |
| A4 | 4 | 11.7 | 19.8 | 0.007 | Example of invention |
| A5 | 5 | 12.2 | <u>22.1</u> | 0.011 | Comparative Example |
| A6 | 6 | 10.1 | 17.2 | 0.000 | Example of invention |
| A7 | 7 | 11.3 | 17.3 | 0.007 | Example of invention |
| A8 | 8 | 11.8 | 18.6 | 0.008 | Example of invention |
| A9 | 9 | 11.9 | <u>24.7</u> | 0.010 | Comparative Example |
| A10 | 10 | 12.6 | <u>31.5</u> | 0.012 | Comparative Example |
| A11 | 11 | 12.3 | 16.6 | 0.008 | Example of invention |
| A12 | 12 | 12.6 | 16.5 | 0.007 | Example of invention |
| A13 | 13 | 13.2 | 17.4 | 0.008 | Example of invention |
| A14 | 14 | 12.4 | <u>30.8</u> | 0.016 | Comparative Example |
| A15 | 15 | <u>44.6</u> | <u>126.4</u> | 0.032 | Comparative Example |
| Average Value among Example of invention | | 11.6 | 17.9 | 0.006 | |

Solution A: 7 mass % HF + 5 mass % HNO₃
Under lined values are out of the range according to the present invention

TABLE 3

Result of Immersion in Solution B

| Test No. | Steel Grade No. | Contact Resistance (mΩ · cm²) | | Atomic Ratio of Mn to Fe Mn/Fe in Film | Note |
|---|---|---|---|---|---|
| | | Before Endurance test | After Endurance test with 1.0 V | | |
| B1 | 1 | 9.3 | <u>45.1</u> | 0.012 | Comparative Example |
| B2 | 2 | 8.4 | 12.1 | 0.005 | Example of invention |
| B3 | 3 | 7.4 | 11.6 | 0.000 | Example of invention |
| B4 | 4 | 8.2 | 12.4 | 0.005 | Example of invention |
| B5 | 5 | 8.6 | <u>20.2</u> | 0.010 | Comparative Example |
| B6 | 6 | 7.9 | 9.9 | 0.000 | Example of invention |
| B7 | 7 | 8.2 | 10.5 | 0.000 | Example of invention |
| B8 | 8 | 8.5 | 11.8 | 0.006 | Example of invention |
| B9 | 9 | 8.6 | <u>23.1</u> | 0.011 | Comparative Example |
| B10 | 10 | 8.8 | <u>29.7</u> | 0.010 | Comparative Example |
| B11 | 11 | 9.2 | 11.2 | 0.006 | Example of invention |
| B12 | 12 | 9.7 | 11.2 | 0.006 | Example of invention |
| B13 | 13 | 9.8 | 11.8 | 0.006 | Example of invention |
| B14 | 14 | 8.8 | <u>28.6</u> | 0.013 | Comparative Example |
| B15 | 15 | <u>37.1</u> | <u>124.8</u> | 0.027 | Comparative Example |
| Average Value among Example of invention | | 8.6 | 11.4 | 0.004 | |

Solution B: 12 mass % HF + 4 mass % HNO₃
Under lined values are out of range according to the present invention.

The invention claimed is:

1. A ferritic stainless steel having a chemical composition containing, by mass %, C: 0.001% or more and 0.05% or less, Si: 0.001% or more and 0.5% or less, Mn: 0.001% or more and 1.0% or less, Al: 0.001% or more and 0.5% or less, N: 0.001% or more and 0.05% or less, Cr: 17% or more and 23% or less, Mo: 0.08% or less and the balance being Fe and inevitable impurities,
the ferritic stainless steel comprising a passivation film on a surface of the stainless steel, wherein the film is obtained by immersing the stainless steel in a solution for an immersion treatment, the solution mainly containing hydrofluoric acid or a liquid mixture of hydrofluoric acid and nitric acid such that in the solution, the relationship represented by the following expression (1) is satisfied:

$$[HF] \geq [HNO_3] \quad (1)$$

($[HNO_3]$ includes zero)

where [HF] denoted the concentration of hydrofluoric acid (mass %) and $[HNO_3]$ denotes the concentration of nitric acid (mass %).

2. The ferritic stainless steel according to claim 1, wherein the concentration of hydrofluoric acid (mass %) [HF] and the concentration of nitric acid (mass %) $[HNO_3]$ in the solution is represented by the following expression (2):

$$[HF] \geq 2.5[HNO_3] \quad (2)$$

($[HNO_3]$ includes zero).

3. The ferritic stainless steel according to claim 2, wherein the chemical composition of the stainless steel further contains, by mass%, one or more of Ti: 0.6% or less, Nb: 0.6% or less, Zr: 0.6% or less, Cu: 1.00% or less and Ni: 1.00% or less.

4. The ferritic stainless steel according to claim 3, wherein the chemical composition of the stainless steel further contains, by mass%, one or more of V: 1.0% or less, W: 1.0% or less, Ca: 0.1% or less, Mg: 0.1% or less, REM (Rare Earth Metals): 0.1% or less and B: 0.1% or less.

5. The ferritic stainless steel according to claim 2, wherein the chemical composition of the stainless steel further contains, by mass%, one or more of V: 1.0% or less, W: 1.0% or less, Ca: 0.1% or less, Mg: 0.1% or less, REM (Rare Earth Metals): 0.1% or less and B: 0.1% or less.

6. The ferritic stainless steel according to claim 1, wherein the atomic ratio of Mn to Fe Mn/Fe in the passivation film is 0.01 or less.

7. The ferritic stainless steel according to claim 6, wherein the chemical composition of the stainless steel further contains, by mass%, one or more of Ti: 0.6% or less, Nb: 0.6% or less, Zr: 0.6% or less, Cu: 1.00% or less and Ni: 1.00% or less.

8. The ferritic stainless steel according to claim 7, wherein the chemical composition of the stainless steel further contains, by mass%, one or more of V: 1.0% or less, W: 1.0% or less, Ca: 0.1% or less, Mg: 0.1% or less, REM (Rare Earth Metals): 0.1% or less and B: 0.1% or less.

9. The ferritic stainless steel according to claim 6, wherein the chemical composition of the stainless steel further contains, by mass%, one or more of V: 1.0% or less, W: 1.0% or less, Ca: 0.1% or less, Mg: 0.1% or less, REM (Rare Earth Metals): 0.1% or less and B: 0.1% or less.

10. The ferritic stainless steel according to claim 1, wherein the chemical composition of the stainless steel further contains, by mass %, one, or more of Ti: 0.6% or less, Nb: 0.6% or less, Zr: 0.6% or less, Cu: 1.00% or less and Ni: 1.00% or less.

11. The ferritic stainless steel according to claim 10, wherein the chemical composition of the stainless steel further contains, by mass%, one or more of V: 1.0% or less, W: 1.0% or less, Ca: 0.1% or less, Mg: 0.1% or less, REM (Rare Earth Metals): 0.1% or less and B: 0.1% or less.

12. The ferritic stainless steel according to claim 1, wherein the chemical composition of the stainless steel further contains, by mass %, one or more of V: 1.0% or less, W: 1.0% or less, Ca: 0.1% or less, Mg: 0.1% or less, REM (Rare Earth Metals): 0.1% or less and B: 0.1% or less.

13. A separator of a proton-exchange membrane fuel cell consisting of the ferritic stainless steel according to claim 1.

14. A proton-exchange membrane fuel cell utilizing the ferritic stainless steel according to claim 1 for a separator.

15. A ferritic stainless steel having a chemical composition containing, by mass %, C: 0.001% or more and 0.05% or less, Si: 0.001% or more and 0.5% or less, Mn: 0.001% or more and 1.0% or less, Al: 0.001% or more and 0.5% or less, N: 0.001% or more and 0.05% or less, Cr: 17% or more and 23% or less, Mo: 0.08% or less and the balance being Fe and inevitable impurities, wherein the film is immersed in a solution for an immersion treatment, the solution mainly containing hydrofluoric acid or a liquid mixture of hydrofluoric acid and nitric acid such that the solution is adjusted so that the relationship between the concentration of hydrofluoric acid (mass %) [HF] and the concentration of nitric acid (mass %) $[HNO_3]$ becomes $[HF] \geq [HNO_3]$ ($[HNO_3]$ includes zero).

16. The ferritic stainless steel according to claim 15, wherein, the concentration of hydrofluoric acid (mass %) [HF] and the concentration of nitric acid (mass %) $[HNO_3]$ in the solution is represented by the following expression (2):

$$[HF] \geq 2.5[HNO_3] \quad (2)$$

($[HNO_3]$ includes zero).

* * * * *